March 4, 1947.   J. RAZEK   2,417,015
ELECTRICAL TELEMETERING SYSTEM
Filed June 13, 1945
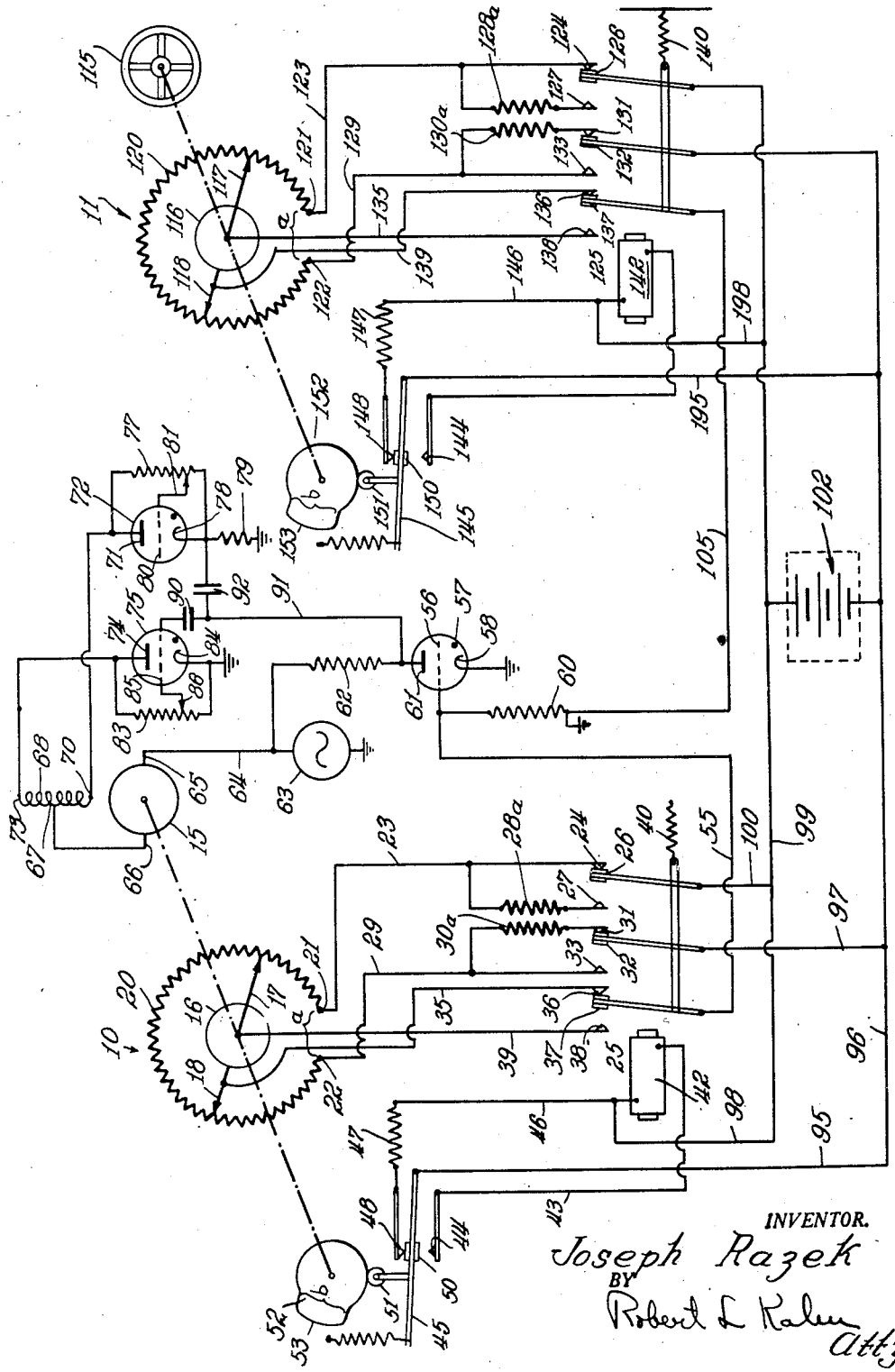
INVENTOR.
Joseph Razek
BY
Robert L. Kahn
Atty Patented Mar. 4, 1947

2,417,015

UNITED STATES PATENT OFFICE 2,417,015

ELECTRICAL TELEMETERING SYSTEM

Joseph Razek, Llanerch, Pa., assignor, by mesne assignments, to Oliver W. Storey, Wheaton, Ill., as trustee for the partnership of O. W. Storey & Associates, Chicago, Ill.

Application June 13, 1945, Serial No. 599,165

10 Claims. (Cl. 172—239)

This invention relates to an electrical apparatus and particularly to a telemetering system. The invention herein permits any desired rotary movement to be duplicated at a distance. At present, so-called Selsyn systems are used for transmitting rotary motion from one station to another station. Such systems involve two or three phase alternating current motors at all stations. They depend upon their operation for the tendency of two or three phase motors or generators to remain electrically geared to each other. Thus, if the stator or rotor of each unit is excited by suitable alternating currents, there is induced in the other windings of each machine voltages whose instantaneous vector sum bears a constant relation to the phase of exciting currents.

Such systems require maintenance of good wave form for rotary correspondence between the spaced machines. In addition, if the motors or generators are of small power, it will be necessary to make such motors or generators special since two or three phase machines are not made in small sizes. Furthermore, the motors require special design with regard to their magnetic circuits.

Such systems further suffer from the defect that the torque tending to angularly align the transmitting and receiving machines grows smaller as the misalignment itself disappears. In other words, the torque tending to align the sending and receiving machines is proportional to the angle of misalignment. Other telemetering systems are characterized by special delicate equipment costing large sums of money and requiring expert servicing.

The invention disclosed herein provides a telemetering system which permits the use of standard motors with slight changes in connections. A system embodying the invention has a highly desirable characteristic in that the torque tending to maintain the load at the receiving station is substantial and never disappears.

The invention in general provides a system of potentiometers at each station so arranged that any angular misalignment of the potentiometers sets up a difference in potential whose magnitude and sign is proportional to the misalignment. At the receiving station, there is provided a system which is responsive to any desired potential difference between these spaced potentiometers, and this potential difference is used to control one or more motors. The motor control system is so designed that only two instantaneous motor conditions are possible—namely, rotation in one direction or rotation in the reverse direction. The motor condition may be a function of a potential whose value is above or below any arbitrary assigned threshold value. For simplicity, zero potential may be assumed as threshold value and positive potentials may be relied upon to cause motor rotation in one direction and negative potentials may be relied upon for causing motor rotation in the reverse direction. The magnitude of the potential, once it is outside of the threshold value, is unimportant. Thus, a positive voltage of ten will be no more effective than one.

When the transmitter and receiver are aligned, the potentiometers set up some arbitrary potential difference therebetween which may be either zero or some assigned positive or negative value. Some small potential variation around the precise threshold value will determine a hunting zone over which the system will tend to oscillate in a balanced condition. The extent of this hunting zone in terms of potential variation will be determined by the sensitivity of the system. Thus, it may be possible to have this variation as much as one or two volts on either side of the threshold value or reduce it down to a small fraction of a volt.

If a zero potential difference is assumed as the theoretical threshold value and if a hunting potential range of a half a volt on either side of zero is assumed, it follows that the system will tend to vary from just above plus one-half a volt to just below minus one-half a volt.

In terms of angularity, the extent of this hunting zone will depend upon such factors as number of volts variation per degree of angle, the actual angle subtended by the width of a wiper, and other mechanical factors.

The drawing shows a system embodying the invention.

Two stations 10 and 11 may be provided, station 10 being for receiving while station 11 is for transmitting purposes. Referring first to station 10, motor 15, to be described in detail later, may be coupled to frame 16 upon which are mounted potentiometer wipers 17 and 18. Potentiometer wipers 17 and 18 are rigid with respect to each other and are aligned to form an angle of 180 degrees. Wipers 17 and 18 both slide or cooperate with resistance 20 or a contact-making portion thereof, the resistance or the contact-making portion thereof being disposed to form an incomplete circle concentric with the wiper axis. Resistance 20 has end terminals 21 and 22 between which is an inactive (as far as potentiometer operation is concerned) arc a substantially less than 180 degrees in angular extent.

In the present form, a linear variation of resistance 20 is assumed along the length thereof between the terminals. Terminal 21 of resistance 20 is connected by lead 23 to contact 24 of relay 25. 24 is a back contact cooperating with movable contact 26. Forward contact 27 cooperating with movable contact 26 is connected through resistance 28a to lead 23. Terminal 22 is connected by lead 29 through resistance 30a to fixed back contact 31 cooperating with movable contact 32. Movable contact 32 also cooperates with forward fixed contact 33 connected to lead 29. It is evident that movable contacts 26 and 32 with their cooperating fixed contacts constitute an interlocked switching system for selectively shorting out the resistances connected to terminals 21 and 22 of resistance 20.

Potentiometer wiper 18 is connected by lead 35 to back contact 36 of the relay, this contact cooperating with movable contact 37. Forward fixed contact 38 is connected by lead 39 to wiper 17. It is understood that the frame that carries wipers 17 and 18 insulates these wipers from each other. Thus, movable contact 37 and its cooperating fixed contacts constitutes a switching system for selecting a wiper to connect to some outside point.

Movable contacts 26, 32, and 37 may be carried in any suitable fashion and biased in the position shown by spring 40. Thus, the entire series of contacts on relay 25 provides for simultaneous operation of two switching systems. The switches are so poled that the inactive wiper is nearest the shorted resistance along a path on resistance 20.

The movable contacts may be pulled against the forward contacts by winding 42. Winding 42 has one terminal connected by lead 43 to contact 44 of switch 45. Winding 42 has its other terminal connected by lead 46 through resistance 47 to fixed contact 48 of switch 45. Switch 45 has movable contact 50 actuated by cam roller 51 bearing against cam 52 driven on the same shaft with wipers 17 and 18. Cam 52 is provided with rise 53 having an angular extent $b$ somewhat larger than angle $a$ but less than 180 degrees. Cam 52 is so aligned with respect to the potentiometers that a wiper in the inactive region and for a short distance on either side thereof is switched out of circuit. As shown, rise 53 should force roller 51 down when wiper 18 is in or near inactive arc $a$. Various cam shapes and alignments are possible depending upon which wiper is to be generally active most of a wiper revolution. It is possible to equalize the wiper action so one is active for half a turn.

As shown herein, when roller 51 bears against cam 52 proper, movable contact 50 is in its upper position bearing against fixed contact 48. When roller 51 bears against rise 53, movable contact 50 is forced against fixed contact 44. Resistance 47 is equal to the resistance offered by winding 42 so that, in either position of switch 45, the load will be the same. Switch 45 itself may be any kind desired, and is preferably of the type capable of acting at high speed. Thus, the switch may be of the type sold in the market under the name Microswitch and described and claimed in United States Patent 1,960,020.

Movable contact 37 of relay 42 is connected by lead 55 to control grid 56 of three-element gas tube 57. Such grid controlled gas tubes are well known and are sold under various trade names such as Thyratron, for example. Tube 57 has cathode 58 grounded and has grid 56 connected to ground through grid resistance 60. Such grid resistance may be of the order of one megohm. Tube 57 has anode 61 connected through load resistor 62 to any suitable source of alternating current 63. Alternating current source 63 is also connected through lead 64 to brush 65 of motor 15. Motor 15 has remaining brush 66 connected to center point 67 of stator winding 68. It is understood that motor 15 may have several sets of brushes, so that brush 65 may be a plurality of brushes of one polarity and brush 66 may be a plurality of brushes of opposing polarity. Similarly, winding 68 may consist of a plurality of windings, each one of which may have center tap 67. Winding 68 has one terminal 70 connected to anode 71 of gas tube 72. Winding 68 has remaining terminal 73 connected to anode 74 of gas tube 75. Tubes 72 and 75 are similar to tube 57 in that they are grid controlled gas tubes. However, tubes 72 and 75 may, in practice, require a higher current and power rating than tube 57.

Tube 72 has anode 71 connected through high resistance 77 to cathode 78, this cathode being connected to ground through load resistance 79. Tube 72 has control grid 80 connected to potentiometer wiper 81 cooperating with resistance 77.

Tube 75 has anode 74 connected through high resistance 83 to grounded cathode 84. This tube has control grid 85 connected to potentiometer wiper 86 cooperating with resistance 83. Control grid 85 is connected through blocking condenser 90 and lead 91 to anode 61 of tube 57. Cathode 78 of tube 72 is connected through blocking condenser 92 to lead 91.

Referring back to switch 45, movable contact 50 thereof is connected by lead 95 to line 96. Movable contact 32 of relay 25 is also connected to line 96 by lead 97. Lead 46 from winding 42 of relay 25 is connected by lead 98 to line 99. This line is also connected by lead 100 to movable contact 26 of relay 25.

Across lines 99 and 96 is potential source 102 which may consist of a battery or, if desired, any source of direct or alternating current.

Lines 99, 96 and line 105 running from ground at station 10 go to transmitting station 11. With the exception of the motor and tube system, the transmitting station duplicates the receiving station. Thus, frame 116 may carry wipers 117 and 118 diametrically opposed as in station 10. Wipers 117 and 118 cooperate with resistance 120 having a contact making portion on a circular arc, this resistance having terminals 121 and 122. Between terminals 121 and 122 is angle $a$.

Terminal 121 is connected by lead 123 to back contact 124 of relay 125. Back contact 124 cooperates with movable contact 126. Movable contact 126 cooperates with forward fixed contact 127 connected through resistance 128a to lead 123.

Contact 122 is connected through wire 129 and resistance 130a to back contact 131. Movable contact 132 may operate between back contact 131 and forward contact 133, this latter contact being connected to lead 129.

Wiper 118 is connected by wire 135 to back contact 136. Movable contact 137 may operate between this back contact and forward contact 138, which is connected by wire 139 to wiper 117.

Relay 125 has winding 142 connected by lead 143 to one fixed contact 144 of switch 145. Winding 142 has its other terminal connected by wire 146 through resistance 147 (equal in value to the resistance of winding 142) to switch contact 148. Between contacts 144 and 148, movable contact 150 may be operated. Movable contact 150 may be moved by roller 151 bearing against cam 152 having rise 153. Cams 152 and 52 may be identical. Obviously, they need not be since each cam need only deenergize a wiper when it is near or in an inactive arc.

Movable contact 126 is connected to line 99, while movable contact 132 is connected to line 96. Movable contact 137 is connected to line 105. Movable contact 150 is connected by lead 195 to line 96, while lead 198 connects wire 146 to line 99.

At transmitting station 11, handle 115 may be provided, this handle being coupled to wipers 117 and 118 as one unit and cam 152 as a second unit. Handle 115 may be either a motor or any other device having continuous or intermittent rotary motion to be transmitted.

For simplicity, let it be assumed that resistances 20 and 120 are both linear. It is not necessary that they be equal. Let us assume that both resistance have an angular extent of 270 degrees. This is merely exemplary and, as will be apparent later, may be varied to suit the occasion. With the above assumption, it is apparent that angle $a$ is 90 degrees. It is clear that there will be at least one wiper in contact with a resistance. Also for simplicity, let it be assumed that resistance 20 and 120 each have a value of one ohm per degree. Thus, the amount of resistance between each pair of wipers will be 180 ohms when both wipers are on the resistance. It is necessary that resistances $28a$ and $30a$ be equal to each other and be equal to the resistance normally included between a pair of wipers when not bridging angle $a$. Thus, in the system assumed, it will be necessary for resistances $28a$ and $30a$ to be each 180 ohms. The same thing is true of resistances $128a$ and $130a$, and the portion of resistance 120 included between 117 and 118 when the wipers do not bridge angle $a$.

As shown in the drawing, wipers 18 and 118 are each connected. Thus, in the position shown, terminals 21 and 121 of the resistances will be substantially at the potential of line 99. Similarly, terminals 22 and 122 will be at the same potential. Thus, if resistance $30a$ bears the same proportion to resistance 20 as resistance $120a$ to resistance 120, it is clear that there will be no difference in potential between terminals 22 and 122.

Wiper 18 playing along resistance 20 will have a certain potential therein which will be communicated to control grid 56 of gas tube 57. If wiper 118 is in proper alignment, the potential of this wiper will be the same as wiper 18, assuming a zero threshold voltage, and will be communicated by wire 105 to ground. In the event that a satisfactory ground exists at station 11, it is understood that wire 105 may be dispensed with.

With the wipers aligned so that an assumed zero potential difference exists, control grid 56 will be at cathode potential. With wipers 18 and 118 aligned, it is preferred to have tube 57 in a condition where the slightest potential difference will cause a change in the tube condition. Thus, if the tube is such that control grid 56 permits the tube to fire when it is at cathode potential, then it is preferred to so arrange the circuit that a slight drop of control grid 56 with relation to cathode 58 will cause the grid to regain control. Since tube 57 is energized by alternating current, grid 56 will regain control every cycle assuming that the grid potential is sufficiently negative. If desired, either control grid 56 may be biased or some angular advance between wipers 18 and 118 may be provided so that the threshold potential at grid 56 may be adjusted differently than zero. At the threshold value, the system is unstable and hunts around that point.

With tube 57 not conducting, anode 61 will have maximum potential thereon. This maximum potential will be impressed through blocking condensers 90 and 92 upon control grid 85 of tube 75 and upon cathode 78 of tube 72. Control grid 85 of tube 75 is so biased by means of potentiometer 86 that the high potential at anode 61 will cause the tube to fire. Control grid 80 of tube 72 is so biased that this same high potential impressed upon cathode 78 will cut tube 72 off.

Upon firing of tube 75, current through motor 15 and the upper portion of winding 68 will flow causing motor 15 to turn in one direction. The direction of rotation of motor 15 is such as to retard wiper 18 with respect to wiper 118. In other words, it will tend to set up a positive difference in potential between 18 and 118. This positive difference in potential will be impressed upon control grid 56 of switch tube 57, and cause this tube to fire. Upon the firing of tube 57, the potential at anode 61 drops. The drop in potential is communicated to control grid 85 and cuts tube 75 off. The same drop in potential is communicated to cathode 78, and causes tube 72 to fire. The firing of tube 72 causes current to go through the lower half of the motor winding and results in motor 15 reversing its direction of movement.

The type of motor used is of no great importance as far as the invention is concerned. Thus, a series motor is disclosed. Such a motor is desirable because of its high starting torque and the ease with which it may be reversed. It is possible, however, to use shunt or compound wound motors or even to use alternating current motors having split phases for controlling the direction of rotation. Thus, one stator winding of an alternating current motor may be continuously energized and two split phase windings may be handled in a manner similar to winding 68.

It is understood that the action of the tubes described above occurs only upon positive portions of the cycle, that is when anodes 61, 71 and 74 are positive with respect to their cathodes. In the event that alternating current is impressed on lines 96 and 99 for control purposes and if this current is at the same frequency as exists in source 63, then it will be understood that both currents will have to be in phase. Thus, control grid 56 should have the positive portion of a cycle impressed upon it in phase with the positive portion of the cycle at anode 61 and cathode 58. It is possible, however, to utilize a higher frequency in lines 96 and 99 and, if the frequency be high enough, the phase relationship between the control system and the motor drive system will be of no importance. Thus, if sixty cycles is present in source 63 and if one thousand cycles is impressed on lines 96 and 99, it is clear that the phase relationship in tube 57 is of no great importance.

Assume that handle 115 is actuated so that wiper 118 approaches terminal 121. This will result in cam 152 operating switch 145 and throw contact 150 down against fixed contact 144. When this occurs, relay 125 will be energized so that movable contacts 126, 132 and 137 will be pulled forward.

In the forward position of relay 125, resistance $128a$ will be switched in series with terminal 121 while resistance $130a$ will be shorted out. Thus, terminal 121 will be at a potential somewhat less than line 99, while terminal 122 will be at a potential of line 96. Wiper 118 will be deenergized and wiper 117 will take over. Due to the relationship of the wipers and resistances, it is clear that wiper 117 will be at the same potential in the system as wiper 118 was prior to relay operation, assuming no change in the wiper positions. It is clear, therefore, that as long as cams 52 and 152 are roughly aligned that the system will work satisfactorily.

When the two wipers are playing over a resistance and neither one is within the inactive arc, it is immaterial which wiper is activated. It is necessary only to disconnect a wiper when it is in the inactive arc. Otherwise, the choice of wipers is of no consequence. The angular extent of the cam rise beyond angle $a$ is of no great importance so long as it remains less than 180 degrees. The cam may have the fall and rise reversed.

Since the difference in potential between live wipers determines whether tube 57 fires or not, it is clear that the sensitivity of the system depends upon two factors. One is the sensitivity of control grid 56 with relation to 58. The other is the potential difference between live wipers per degree of misalignment.

Either one or both of balancing resistances 47 and 147 may be omitted. These balancing resistances only serve to regulate the potential across lines 96 and 99. In the event that the line wire itself introduces a resistance drop due to current drawn by one or both relay windings, the effect on the differential voltage used for control purposes will be unimpaired. However, where great sensitivity is required and where the system may have substantial energy storage, such as might be due to the presence of capacitance or inductance, some means for maintaining substantially constant line currents may be desirable.

It is possible to eliminate the cam and cam control switch at each station and substitute equivalent means. Thus, discs having openings therethrough for a light beam in a photoelectric control system may be provided. It is also possible to provide a sort of commutator with segments proportioned and disposed to duplicate the required switching.

With regard to the motor control system, it is evident that separate motors may be provided, one motor tending to turn the motor shaft in one direction and the other motor tending to turn the motor shaft in the reverse direction.

It is, of course, possible to reverse the rotation of one shaft with respect to the remaining shaft in the telemetering system. This may be accomplished either by reversing the connections from line 96 to 99 to one station.

Either or both of resistances 20 and 120 may be nonlinear. Thus, either resistance may vary according to some periodic or cyclic function such as a trigonometric function. As an example, resistance 20 or 120 or both may vary according to the sine or cosine of angle of wiper rotation. The algebraic sign of the function will be unaffected.

What is claimed is:

1. A potentiometer system comprising a first resistance having terminals and a contact-making portion along the length thereof disposed to form an incomplete circle with the remainder of said circle forming an inactive angular arc of substantially less than 180 degrees, a pair of relatively rigid wipers rotatable around the center of said circle and cooperating with said contact-making portion, said wipers forming an angle of 180 degrees therebetween, a fixed resistance connected to each terminal of said first resistance, there being two fixed resistances with a free terminal on each for connection to a source of potential, each fixed resistance being equal in value to a part of the first resistance directly included between wipers when both contact the first resistance, switching means for selectively shorting out a fixed resistance, additional switching means for selectively connecting a wiper to a circuit for utilizing said potentiometer system, means for operating said additional switching means to disconnect that one of the two wipers which lies within an arc overlying the inactive arc and a small region bordering the ends of said inactive arc, means for simultaneously operating said two switching means, said switching means being so poled that the fixed resistance adjacent the inactive wiper as measured along the first resistance is shorted out, said potentiometer output being taken between a connected wiper and the shorted fixed resistance.

2. A system for obtaining a potential for use in a telemetric system comprising two stations, each station having a potentiometer system as follows; a first resistance having terminals and a contact-making portion along the length thereof disposed to form an incomplete circle with the remainder of said circle forming an inactive angular arc of substantially less than 180 degrees in extent, a pair of relatively rigid wipers rotatable around the center of said circle and cooperating with said contact-making portion, said wipers forming an angle of 180 degrees therebetween, a fixed resistance connected to each terminal of said first resistance, there being two fixed resistances with a free terminal on each, each fixed resistance being equal in value to a part of the first resistance directly included between the wipers when both contact the first resistance, switching means for selectively shorting out a fixed resistance, additional switching means for selecting an active wiper for connection to a circuit for utilizing said potentiometer system, means for operating said additional switching means to disconnect that one of the two wipers which lies within an arc overlying the inactive arc and a small region bordering the ends of said inactive arc, means for simultaneously operating said two switching means, said switching means being so poled that the fixed resistance adjacent the inactive wiper as measured along the fixed resistance is shorted out; a pair of line wires running between said stations, connections from the free terminals of said fixed resistances in each potentiometer system to said line wires, the connections at one station corresponding to those at the other, whereby each potentiometer system is connected across said two line wires, means for impressing a potential across said line wires, and a connection from an active wiper of each system, said two last-named connections having a substantially fixed predetermined potential difference therebetween upon interstation alignment of said wipers on the cooperating resistances.

3. The system of claim 2 wherein a reversible motor system is provided rigidly connected to a pair of wipers, voltage responsive direction-selecting means for controlling motor rotation, said direction controlling means being responsive to a predetermined threshold voltage and tending to cause motor rotation in one direction above said threshold voltage and reverse rotation below said threshold voltage and means for applying the differential potential between the active wipers at both stations to said voltage responsive control means.

4. The system of claim 1 wherein said means for operating said additional switching means includes commutating means angularly aligned with said two wipers.

5. A telemetering system comprising a receiving station and transmitting station, a potentiometer system in each station as set forth in claim 1, a pair of line wires connecting the corresponding free terminals of the fixed resistances of said potentiometer systems, a potential source connected across said line wires, connections from the active wipers in both stations, potential controlled switching means connected to said last-named connections, said switching means being responsive to a predetermined threshold voltage for opening or closing a circuit, a motor system, a control circuit for said system for selecting the direction of motor rotation, and connections between said potential controlled switch and said control circuit for selecting a direction of motor rotation in accordance with the condition of said potential controlled switch.

6. A telemetering system comprising a receiving station and transmitting station, a reversible motor at the receiving station, rotatable means at the transmitting station, said rotatable means having its motion duplicated at the receiving station, a potentiometer system at each station, said potentiometer system comprising the following: a first resistance having terminals and a contact-making portion along the length thereof disposed to form an incomplete circle with the remainder of said circle forming an inactive angular arc of substantially less than 180 degrees, a pair of relatively rigid wipers rotatable around the center of said circle and cooperating with said contact-making portion, said wipers forming an angle of 180 degrees therebetween, a fixed resistance connected to each terminal of said first resistance, there being two fixed resistances with a free terminal on each for connection to a source of potential, each fixed resistance being equal in value to a part of the first resistance directly included between wipers when contacting the first resistance, switching means for selectively shorting out a fixed resistance, additional switching means for selectively connecting a wiper to a circuit; means for rotatably coupling said wipers to the motor at the receiving station, means for rotatively coupling said wipers to the rotatable means at the transmitting station, means coupled to said wipers at each station for simultaneously operating said switching means and timed to change the position of said switching means when one of each pair of wipers lies within the inactive arc and small regions adjacent the ends of said inactive arc, said switching means being so poled that the fixed resistance adjacent the inactive wiper is shorted out and that wiper selected as inactive which is within the inactive arc and regions bordering the ends thereof, a pair of lines connecting corresponding free terminals on said fixed resistances, a source of potential connected across said lines, connections from that portion of said switching means selecting the wipers, said last-named connections being adapted to have a potential difference therebetween whose magnitude and sign depend upon the angular misalignment of the pair of wipers at one station with respect to the pair of wipers at the other station, and means controlled by said wiper connections for controlling the direction of motor rotation, said last-named means being adapted to cause motor rotation in one direction upon a potential difference in wipers in excess of a predetermined threshold value and to cause motor rotation in a reverse direction upon a potential difference between wipers less than said threshold value.

7. The system of claim 6 wherein said motor control system comprises means responsive to said wiper differential potential and a switching system connected to two circuits, said switching system being adapted to close one circuit and open the other or vice versa, said motor having windings determining the direction of motor rotation included in said circuits, and said wiper differential responsive means throwing said last-named switching means to a position determined by the character of the potential difference between active wipers.

8. The system of claim 6 wherein said motor control system comprises means responsive to said wiper differential potential and a pair of gaseous conduction devices, connections between said devices so that when one device conducts the other one is non-conducting, said motor having windings determining the direction of motor rotation included in circuits with said devices, said wiper differential responsive means controlling which device conducts to control the direction of rotation of said motor.

9. The system of claim 6 wherein said motor control system comprises a grid-controlled gaseous conduction device, an alternating current supply source for said device, said wiper differential connections being made to the control portion of said device whereby said device has a discharge or is non-conducting depending upon the connection and sign of the potential difference between active wipers and wherein said motor has windings determining the direction of motor rotation, and circuit means controlled by said gaseous conduction device for selectively energizing certain of said motor windings to select the direction of motor rotation.

10. The system of claim 6 wherein said motor control system comprises a grid-controlled gaseous conduction device having the wiper differential connections connected to said grid circuit, an alternating current supply source for said gaseous conduction device, a pair of additional grid-controlled gaseous conduction devices, said motor having windings determining the direction of motor rotation including one additional gaseous conduction device as part of the circuit for each winding, the winding determining one motor direction including one additional gaseous conduction device as part of the circuit, the winding determining reverse motor direction including the remaining additional gaseous conduction device in circuit therewith, and connections between said first named gaseous conduction device and said additional gaseous conduction devices whereby said first-named gaseous conduction device may select which of said additional gaseous conduction devices will conduct by virtue of its own conducting or non-conducting condition.

JOSEPH RAZEK.

REFERENCES CITED

The following references are of record in the file of this patent:

UNITED STATES PATENTS

| Number | Name | Date |
|---|---|---|
| 460,199 | Cushing et al. | Sept. 29, 1891 |
| 582,663 | Morgan | May 18, 1897 |